United States Patent [19]
Ikeda

[11] Patent Number: 5,822,983
[45] Date of Patent: Oct. 20, 1998

[54] APPARATUS FOR CONTROLLING INTERNAL COMBUSTION ENGINE MOUNTING ELECTRICALLY HEATED CATALYST

[75] Inventor: Shinji Ikeda, Mishima, Japan

[73] Assignee: Toyota Jidosha Kabushiki Kaisha, Aichi, Japan

[21] Appl. No.: 714,719

[22] Filed: Sep. 16, 1996

[30] Foreign Application Priority Data

Sep. 21, 1995 [JP] Japan .................................. 7-243135

[51] Int. Cl.$^6$ ...................................................... F01N 3/20
[52] U.S. Cl. ........................... 60/284; 60/286; 60/300; 123/339.18
[58] Field of Search ........................ 60/276, 277, 284, 60/285, 286, 300; 123/339.18; 219/202, 205; 290/40 A

[56] References Cited

U.S. PATENT DOCUMENTS

| | | | |
|---|---|---|---|
| 5,327,991 | 7/1994 | Yoshida | 180/65.4 |
| 5,512,789 | 4/1996 | Lyon | 60/300 X |
| 5,609,024 | 3/1997 | Fujiwara et al. | 60/284 |
| 5,645,745 | 7/1997 | Hartwick et al. | 60/300 X |

FOREIGN PATENT DOCUMENTS

| | | |
|---|---|---|
| 5-312029 | 11/1993 | Japan . |
| 6-101458 | 4/1994 | Japan . |
| 6-101459 | 4/1994 | Japan . |
| 6-93838 | 4/1994 | Japan . |
| 7-27000 | 1/1995 | Japan . |
| WO-A-9113247 | 9/1991 | WIPO . |

OTHER PUBLICATIONS

SAE 1994 Transactions–Jounral of Fuels and Lubricants, Paper SAE941042, vol. 103, No. 4, 1944, USA, pp. 703–710, XP000609303, P.M. Laing: "Development of an Alternator–Powered Electrically–Heated Catalyst System".

Primary Examiner—Tony M. Argenbright
Attorney, Agent, or Firm—Kenyon & Kenyon

[57] ABSTRACT

When an electric current is supplied to an electrically heated catalyst mounted on a vehicle, oxygen that is required is supplied by setting the air-to-fuel ratio to become lean, and the engine during this period is prevented from losing stability. When the electrically heated catalyst is in a condition to be supplied with an electric current, the alternator driven by the internal combustion engine is disconnected from the battery and the current is supplied to the electrically heated catalyst. At the same time, the air-to-fuel ratio of the internal combustion engine is set to the lean region, and a deviation is found between the present engine running speed and the target running speed found from the operation conditions of the engine. The field current of the alternator is controlled toward a direction in which the deviation decreases and, at the same time, the amount of electric power supplied from the alternator to the electrically heated catalyst is monitored. When an average amount of electric power supplied within a predetermined period of time becomes smaller than a predetermined value, the running speed of the internal combustion engine is forcibly increased to promote the rise of temperature based upon the reaction of the catalyst with the fuel and, at the same time, the internal combustion engine is prevented from losing stability even under the lean conditions.

12 Claims, 8 Drawing Sheets

APPARATUS FOR CONTROLLING INTERNAL COMBUSTION ENGINE MOUNTING ELECTRICALLY HEATED CATALYST

BACKGROUND OF THE INVENTION

1. Field of the Invention

The present invention relates to an apparatus for controlling an internal combustion engine mounting an electrically heated catalyst. More particularly, the invention relates to an apparatus for controlling an internal combustion engine in which an electric current is supplied to an electrically heated catalyst attached to the exhaust gas passage in order to promote the activation of the catalyst, wherein the secondary air is not supplied at the time of electrically heating the catalyst but, instead, a lean air-to-fuel ratio is established to increase the amount of oxygen in order to accomplish the rise in the temperature based upon the reaction of the catalyst with the fuel.

2. Description of the Related Art

Exhaust gases emitted from an internal combustion engine of a vehicle contain such harmful substances as HC (hydrocarbons) and NOx (nitrogen oxides). In an exhaust gas passage of an internal combustion engine is usually provided a catalytic converter which is a device for removing impurities contained in the exhaust gases. However, it has been known that when the temperature of the catalyst is low (in an inactive state), the three-way catalyst used in the catalytic converter works to remove only some of the harmful substances contained in the exhaust gases. Therefore, when the catalytic converter is in the inactive state after cold starting of the internal combustion engine, the exhaust gases cannot be cleaned to a sufficient degree.

There has been proposed a device for cleaning exhaust gases which is installed in the exhaust gas passage on the upstream side of the catalytic converter, the device incorporating an electrically heated second catalytic converter (EHC: electrically heated catalyst) carrying an oxidizing catalyst and having an electric heater, so that when the catalytic converter is still inactive, the second catalytic converter is electrically heated to activate the oxidizing catalyst and to promote the removal of HC.

Electric power must be supplied to the second catalytic converter (hereinafter referred to as electrically heated catalyst) only until the catalytic converter is activated. So far, therefore, a constant amount of electric power has been supplied for only a predetermined period of time in which the electric current must be supplied to the electrically heated catalyst such as at the time of cold starting of the internal combustion engine. However, the electrically heated catalyst exhibits different temperature-rise characteristics depending upon the conditions of the internal combustion engine. Recently, therefore, the supply of electric power to the electrically heated catalyst has been controlled by detecting the temperature of the electrically heated catalyst. However, a temperature sensor is required to directly detect the temperature of the electrically heated catalyst. Therefore, it has heretofore been attempted to detect the electric resistance of the electrically heated catalyst that increases with an increase in the catalyst temperature.

The electrically heated catalyst is usually supplied with electric power from a battery. When a large amount of electric power is supplied from the battery to the electrically heated catalyst in the low-temperature conditions in which the capacity of the battery is low, however, the voltage of the battery so drops that the life of the battery is shortened.

Therefore, there has been proposed a system in which the electric power is supplied to the electrically heated catalyst directly from an alternator which is a generator driven by the internal combustion engine mounted on the vehicle (e.g., see SAE Paper 941042: Development of an Alternator-Powered Electrically-Heated Catalyst System, Paul M. Laing, Ford Motor Co.).

The exhaust system in which the catalyst is being heated requires oxygen in the exhaust gases in order to accomplish the rise of the temperature based upon the reaction of the catalyst with the fuel. Therefore, devices have been proposed according to which the air on the clean side of the air cleaner is supplied as the secondary air by using an air pump, or the clean side of the air cleaner is connected to the upstream side of the electrically heated catalyst in the exhaust gas passage through a secondary air introduction passage in order to introduce the secondary air through this secondary air introduction passage.

According to technology disclosed in the SAE Paper 941042, however, the exhaust gases are not cleaned until the electrically heated catalyst is heated up to the activating temperature, and it is desired to improve cleaning performance of the system. Besides, the device for feeding the secondary air to the upstream side of the electrically heated catalyst when it is heated requires an air pump as well as a reed valve or an electromagnetic opening/closing valve in the secondary air introduction passage, causing the system to become expensive.

SUMMARY OF THE INVENTION

It is therefore an object of the present invention to provide an apparatus for controlling an internal combustion engine mounting an electrically heated catalyst wherein such that, when an electric current is supplied to the electrically heated catalyst, the air-to-fuel ratio of the internal combustion engine is controlled to become lean so that the amount of oxygen increases in the exhaust gases without the need of supplying the secondary air to the upstream side of the electrically heated catalyst, and the electric current is supplied to the electrically heated catalyst from the alternator mounted on the internal combustion engine making it possible to control the load to the internal combustion engine, in order to promote the rise of the temperature based upon the reaction of the catalyst with the fuel without causing the internal combustion engine to lose stability under lean conditions.

In order to accomplish the above-mentioned object, a first aspect of the present invention is concerned with an apparatus for controlling an internal combustion engine mounting an electrically heated catalyst having a catalyst carrier which is attached to the exhaust gas passage and is electrically heated, comprising an operation condition detection means, a current-supplying condition detection means, an alternator connection switching means, an air-to-fuel ratio-setting means, a target running speed calculation means, a running speed deviation operation means, and field current control means. According to this constitution, the operation condition detection means detects the operation condition of the internal combustion engine, the current-supplying condition detection means detects whether the electric current is being supplied to the electrically heated catalyst or not, the alternator connection switching means disconnects the alternator driven by the internal engine from the battery and connects it to the electrically heated catalyst under the condition where the electric current is to be supplied to the electrically heated catalyst, the air-to-fuel ratio-setting means sets the air-to-fuel ratio of the internal combustion engine to a lean region when the electric current is being supplied to the electrically heated catalyst, the target running speed operation means calculates a present target running speed of the engine from the detected operation conditions of the internal combustion engine, the running speed deviation calculation means calculates a deviation between a target running speed that is calculated and the present running speed of the engine, and the field current control means controls the field current of the alternator toward a direction in which the deviation decreases.

The first aspect may further be provided with an amount of supplied electric power-monitoring means for monitoring the amount of electric power supplied from the alternator to the electrically heated catalyst, and a means for increasing the amount of electric power generated by the alternator in order to forcibly increase the field electric current by a predetermined value only in case an average amount of electric power that is supplied within a predetermined period of time becomes smaller than a predetermined value.

In order to accomplish the above-mentioned object according to a second aspect of the present invention, the first aspect is further provided with amount of intake air control means which controls the amount of the air taken in by the internal combustion engine toward a direction in which the above-mentioned deviation decreases.

The second aspect may be further provided with an amount of supplied electric power-monitoring means for monitoring the amount of the electric power supplied from the alternator to the electrically heated catalyst, and an engine running speed correction means for forcibly increasing the target running speed of the internal combustion engine when an average amount of the electric power supplied within a predetermined period of time becomes smaller than a predetermined value.

According to the first aspect of the present invention, the air-to-fuel ratio of the internal combustion engine is set to be lean in order to decrease HC in the exhaust gases. Besides, the field current of the alternator is controlled to so control the load to the internal combustion engine that a deviation is eliminated between a target running speed of the engine and the practical running speed, so that the internal combustion engine will not lose stability under lean conditions. According to the first aspect, furthermore, when the amount of the generated electric power has decreased as a result of controlling the field current of the alternator, the field current of the alternator is forcibly increased to compensate for the lack of electric power supplied to the electrically heated catalyst. Therefore, the condition for heating the electrically heated catalyst is not affected.

According to the second aspect of the present invention, furthermore, the amount of the intake air is controlled to eliminate the deviation between a target running speed of the engine and the practical running speed, in addition to the action of the first aspect. This makes it possible to further prevent the internal combustion engine from losing stability under lean conditions. According to the second aspect, when the amount of the generated electric power has decreased as a result of controlling the field current of the alternator, the running speed of the internal combustion engine is caused to increase to compensate for the lack of electric power supplied to the electrically heated catalyst. Therefore, the condition for heating the electrically heated catalyst is not affected.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
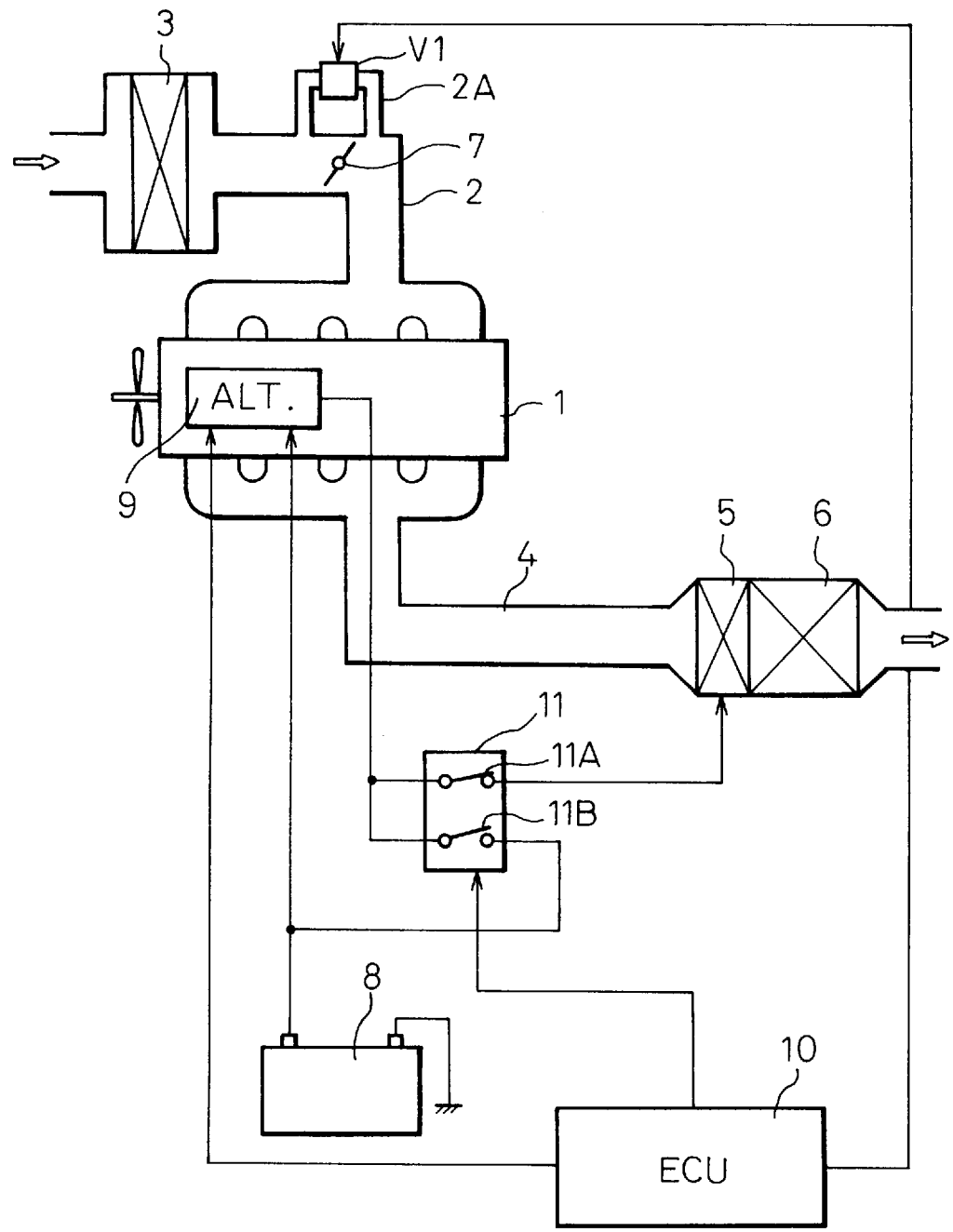
FIG. 1 is a diagram illustrating the whole constitution of an apparatus for controlling an internal combustion engine mounting an electrically heated catalyst according to an embodiment of the present invention.

FIG. 1 illustrates the whole constitution of an apparatus for controlling an internal combustion engine mounting an electrically heated catalyst according to an embodiment of the present invention.

In FIG. 1, reference numeral 1 denotes an internal combustion engine. An air cleaner 3 is provided in an intake passage 2, and a throttle valve 7 is located on the downstream side thereof. The intake passage 2 is provided with an ISC (idle speed control) passage 2A which by-passes the throttle valve 7 to let the intake air flow to the downstream side of the throttle valve 7. An ISC valve V1 is provided in the ISC passage 2A. The ISC valve V1 is duty-controlled for its opening degree by pulse signals. An ordinary catalytic converter 6 is provided in the exhaust gas passage 4 of the internal combustion engine 1, and an electrically heated catalyst 5 is provided on the upstream side of the catalytic converter 6 and close thereto.

On the internal combustion engine 1 is provided an alternator 9 which is a generator for generating electricity while being driven by the internal combustion engine 1, and a battery 8 mounted on the vehicle is electrically charged by the alternator 9 that generates electricity. The alternator 9 receives control signals from an ECU (engine control unit) 10.

In this embodiment, the output of the alternator 9 is input to either the electrically heated catalyst 5 or the battery 8 via a relay 11. The relay 11 has two contacts 11A and 11B, the contact 11A turning on or off the electric power to the electrically heated catalyst 5 and the contact 11B turning on or off the electric power to the battery 8. The relay 11 is driven by a control signal from the ECU 10, and the contact 11A is turned on when the electric current is to be supplied to the electrically heated catalyst 5 and the contact 11B is turned on when the battery 8 is to be electrically charged.

The ECU 10 opens and closes the ISC valve V1 provided in the ISC passage 2A, and the ISC valve V1 receives a control pulse from the ECU 10. The opening degree of the ISC valve V1 is controlled depending upon the duty ratio of the control pulse.

In an internal combustion engine mounting the electrically heated catalyst, oxygen must be supplied to raise the temperature based upon the reaction of the catalyst with the fuel in the exhaust system when the electrically heated catalyst is being heated. So far, therefore, the secondary air has been supplied by using an air pump or the like, or the secondary air has been supplied by connecting the clean side of the air cleaner 3 to the upstream side of the electrically heated catalyst 5 through a secondary air introduction passage.

According to this embodiment, however, the secondary air for supplying oxygen necessary for heating the electrically heated catalyst 5, is not supplied to the upstream side of the electrically heated catalyst 5. Instead, in this embodiment, oxygen necessary for heating the electrically heated catalyst 5 is supplied by setting the air-to-fuel ratio of the internal combustion engine to be lean by means of the ECU 10. In other words, the air-to-fuel ratio is set to be lean, so that oxygen remains in large amounts in the exhaust gases. The air-to-fuel ratio is represented by a ratio of the fuel that is injected to the amount of the air taken in by the internal combustion engine. To set the air-to-fuel ratio to be lean, therefore, either the amount of fuel injected should be decreased or the amount of the intake air should be increased. The amount of fuel injection can be decreased by decreasing the air-to-fuel ratio correction coefficient which multiplies a basic amount of fuel injection that is found by calculation from the operation condition parameters of the engine. The amount of the intake air can be increased by increasing the opening degree of the ISC valve V1.

Figure 2:
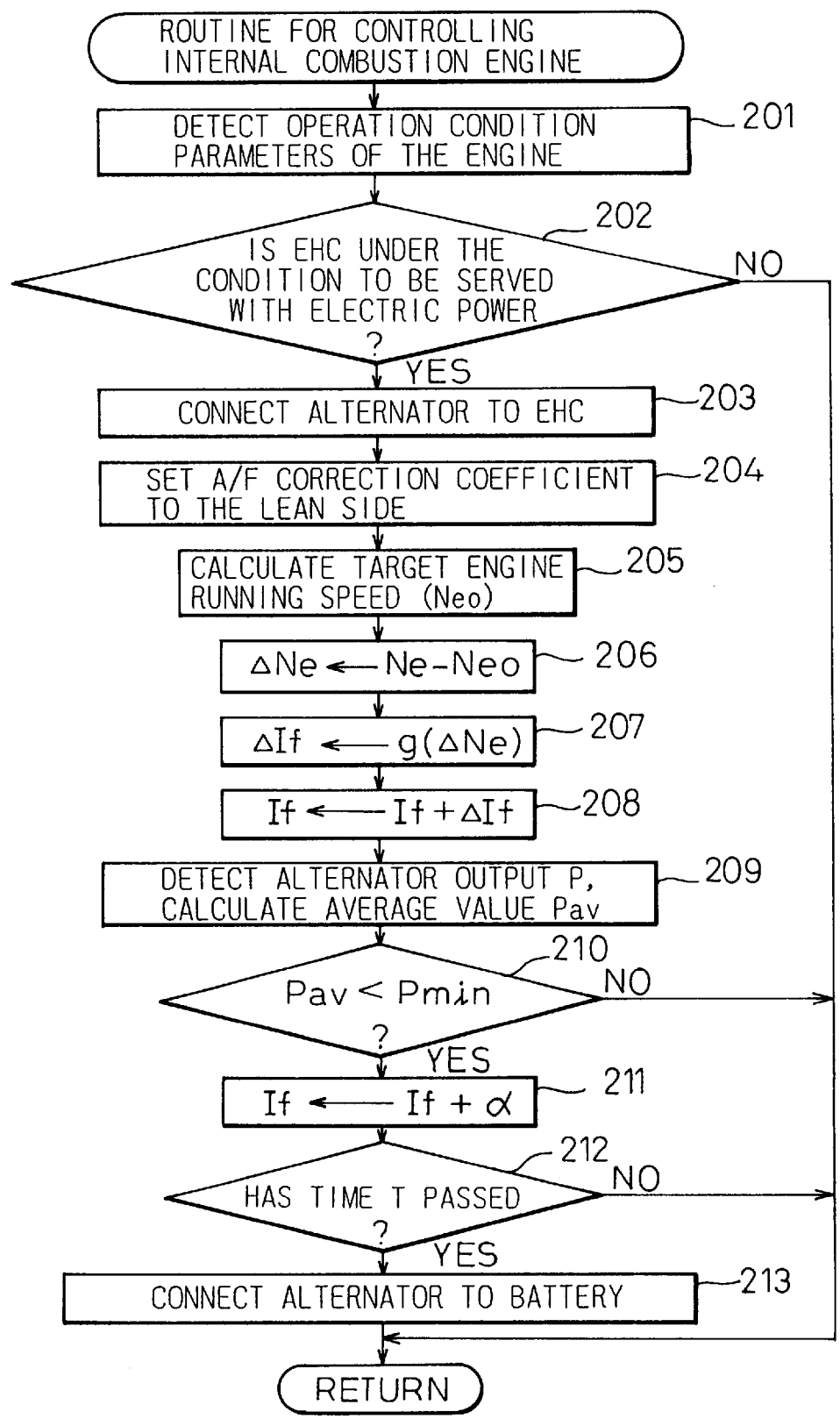
FIG. 2 is a flow chart illustrating a routine for controlling the internal combustion engine in the apparatus for controlling the internal combustion engine mounting the electrically heated catalyst of the form shown in FIG. 1.

Described below with reference to a flow chart of FIG. 2 is a control procedure in the apparatus for controlling the internal combustion engine mounting the electrically heated catalyst, which is constituted as described above, by setting the air-to-fuel ratio of the internal combustion engine to be lean when the electric power is being supplied to the electrically heated catalyst 5 (hereinafter, the electrically heated catalyst 5 is expressed as EHC 5) but without causing the internal combustion engine to lose stability. The routine for controlling the EHC 5 may be executed at intervals of about 10 ms.

At a step 201, first, operating condition parameters of the internal combustion engine, e.g., water temperature, running speed of the engine, temperature of the external air, amount of the intake air, etc. are detected. At a next step 202, it is determined whether the EHC 5 is in a condition to be supplied with electric power. When the EHC 5 is not in a condition to be supplied with electric power, the routine ends. When the EHC 5 is in a condition to be supplied with electric power, the program proceeds to a step 203. The conditions where the EHC 5 is to be supplied with electric power may be, for example, that the water temperature is not higher than 20° C. in the internal combustion engine, the vehicle speed is not higher than 3 km/h, etc.

At a step 203, the contact 11A of the relay 11 is turned on, and the alternator 9 is connected to the EHC 5. At a next step 204, the air-to-fuel ratio correction coefficient is set to a value on the lean side. At a step 205, a target running speed Neo of the engine is calculated based upon the operation condition parameters of the engine found at the step 201.

Figure 3:
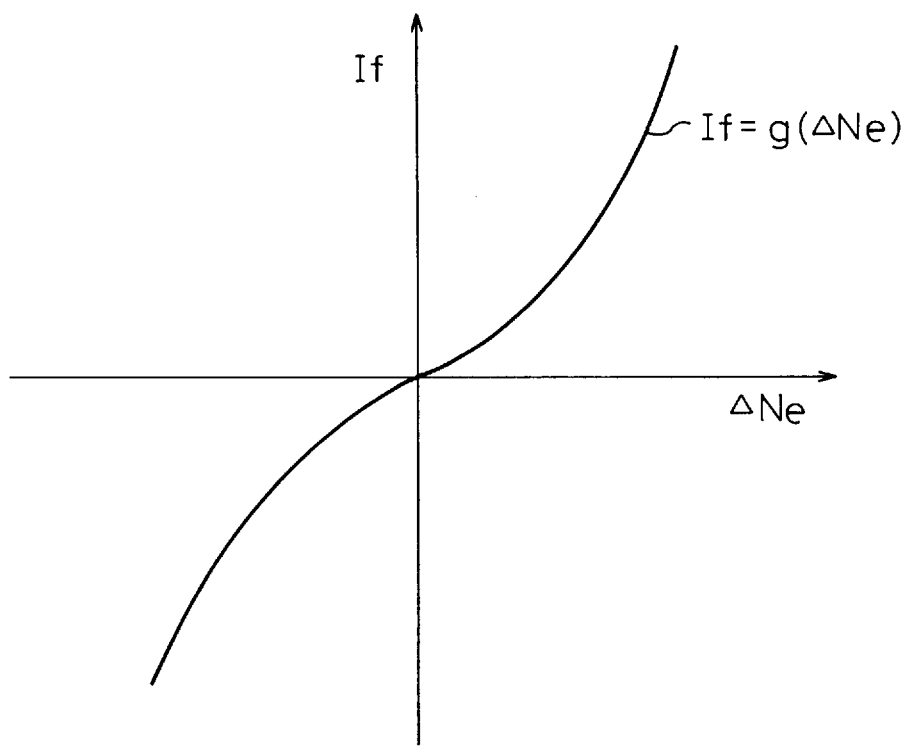
FIG. 3 is a diagram of characteristics for operating a correction value for the field current of an alternator in response to a deviation between a desired running speed of the internal combustion engine and the practical running speed.

At a step 206, a deviation $\Delta Ne$ is found between the target running speed Neo of the engine and the running speed Ne of the engine that is detected and at a step 207, a correction field current $\Delta If$ for correcting the field current of the alternator 9 is found by $g(\Delta Ne)$ from the deviation $\Delta Ne$ between the practical running speed Ne and the target running speed Neo of the engine. FIG. 3 illustrates the $\Delta If = g(\Delta Ne)$ characteristics.

After the correction field current $\Delta If$ is found at the step 207, a final field current If is calculated at a step 208 by adding the correction field current $\Delta If$ to the present field current If. As the final field current If is found as described above, the electric power output from the alternator 9 with this final field current If is detected at a step 209, and an average value Pav of the output power P within a predetermined period of time is calculated.

At a following step 210, it is determined whether the average value Pav of the power P output by the alternator 9, within a predetermined period of time that is calculated, is smaller than a lower limit Pmin of the output power of the alternator 9 or not. When Pav$\geq$Pmin, the routine ends. When Pav<Pmin, the output power P of the alternator 9 is insufficient, and the program proceeds to a step 211. At the step 211, a predetermined value $\alpha$ is added to the present field current If to increase the output power P of the alternator 9 to prevent insufficient heating of the EHC 5.

After the completion of the step 211, it is determined at a step 212 whether a predetermined period of time T has passed or not. When the predetermined period of time T has not been passed, the routine ends. When it is, on the other hand, discriminated at the step 212 that the predetermined period of time T has passed, the contact 11A of the relay 11 is turned off and the contact 11B is turned on at a step 213, and the alternator 9 is connected to the side of the battery 8 to terminate the supply of electric current to the EHC 5. The predetermined period of time T may be about 20 seconds after the start of supplying the electric current to the EHC 5.

Figure 4A:
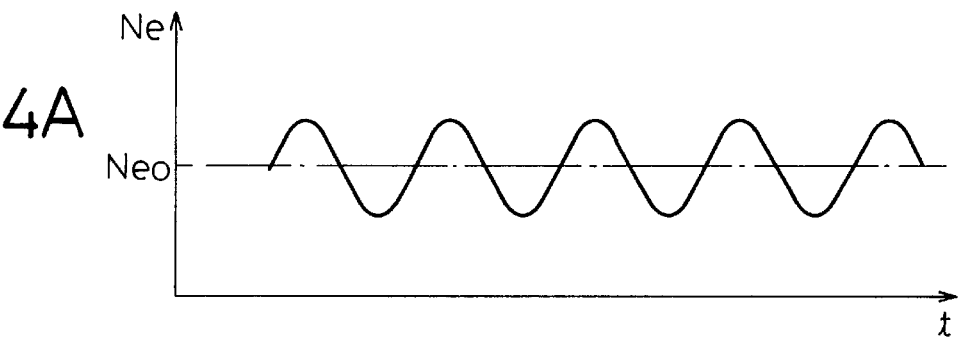
FIG. 4A is a diagram illustrating a fluctuation in the practical running speed of the engine relative to a desired running speed of the engine.
Figure 4B:
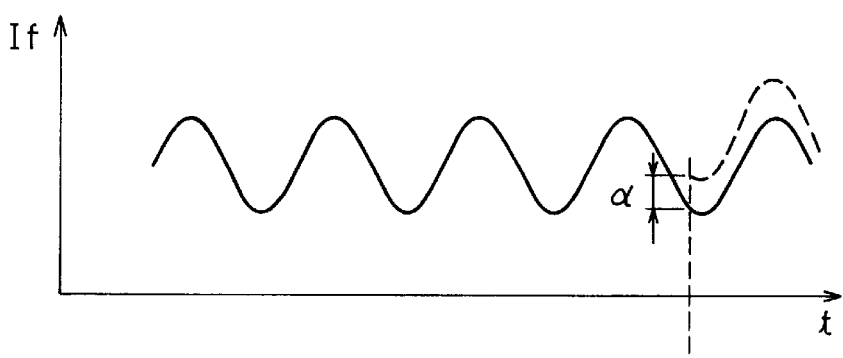
FIG. 4B is a diagram illustrating field current control characteristics in response to the fluctuation in the running speed of the engine of FIG. 4A.
Figure 4C:
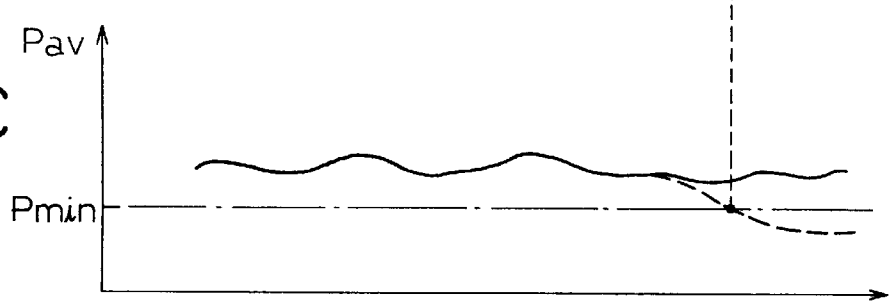
FIG. 4C is a diagram illustrating an average current output from the alternator depending upon a field current of FIG. 4B for every predetermined period of time.

FIGS. 4A to 4C illustrate changes in the engine running speed Ne, in the field current If and in the average value Pav of the output of the alternator 9 under the control in compliance with the flow chart of FIG. 2. When the practical engine running speed Ne changes relative to the target engine running speed Neo as shown in FIG. 4A, the field current If changes as shown in FIG. 4B following the above change. That is, when the engine running speed Ne becomes larger than the target engine running speed Neo, the correction value in the field current If of the alternator 9 increases and the field current If increases as will be understood from the characteristics of FIG. 3. The load to the engine increases with an increase in the field current If of the alternator 9, and the running speed of the engine decreases. This, however, becomes opposite when the engine running speed Ne becomes smaller than the target engine running speed Neo. As will be understood from the characteristics of FIG. 3, the correction value in the field current If of the alternator 9 decreases, and the field current If decreases. The load to the engine decreases with a decrease in the field current If of the alternator 9 and the running speed of the engine increases.

In the foregoing embodiment as described above, HC in the exhaust gases decreases as the air-to-fuel ratio of the internal combustion engine is set to the lean side. Besides, the field current of the alternator is controlled and the load to the internal combustion engine is so controlled that a deviation disappears between the target running speed of the engine and the practical running speed. Therefore, the engine is prevented from losing stability under lean conditions.

Furthermore, when the average value Pav of the output P of the alternator 9 becomes smaller than the lower limit Pmin as indicated by a broken line in FIG. 4C, the field current If is caused to increase as indicated by a broken line in FIG. 4B, whereby an increased amount of electric power is supplied from the alternator 9 to the EHC 5 which is then reliably heated.

Figure 5:
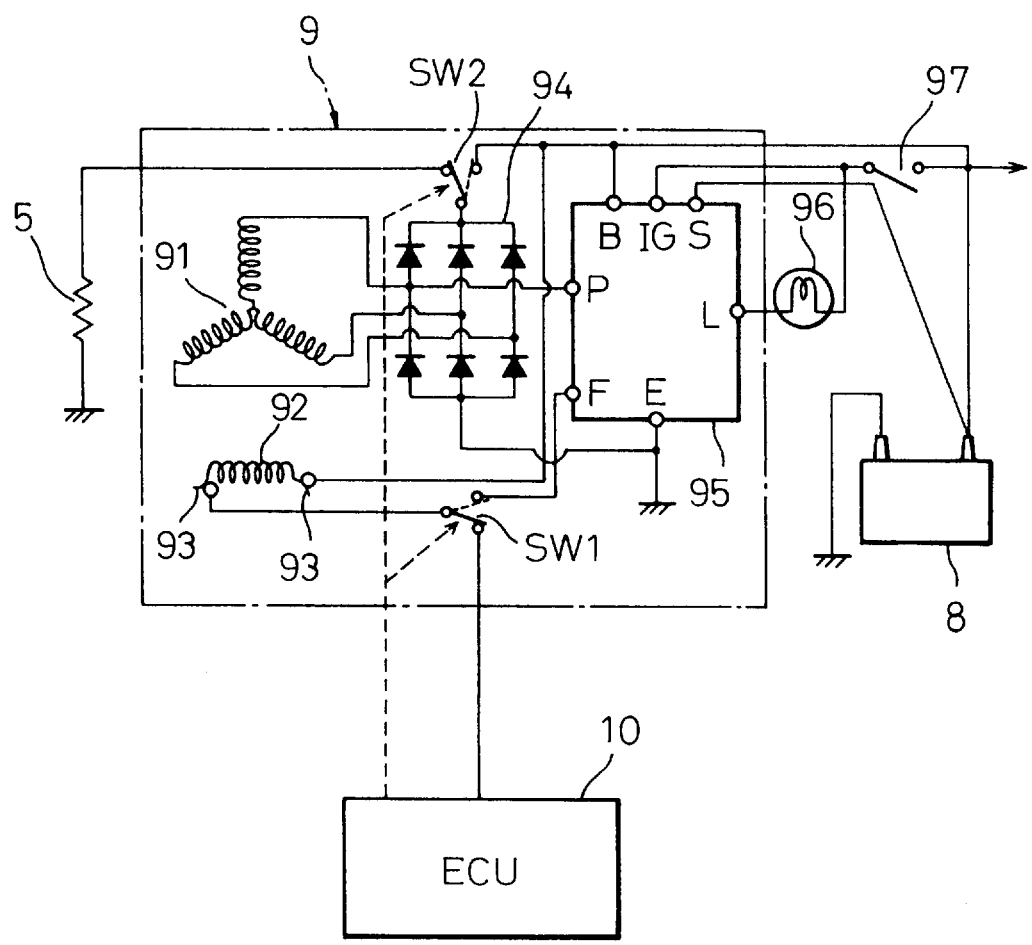
FIG. 5 is a diagram illustrating the circuits, around the alternator, constituting the internal structure of the alternator and the connections to the electrically heated catalyst, the ECU and the battery according to the embodiment of FIG. 1.

FIG. 5 is a diagram illustrating the internal structure of the alternator 9 of FIG. 1 and the circuits in the periphery of the alternator constituting a concrete connection among the EHC 5, ECU 10 and battery 8. The field current of the alternator 9 is controlled by the ECU 5 and the output of the alternator 9 is supplied to the EHC 5. In this embodiment, the relay 11 in the embodiment explained in FIG. 1 has been incorporated in the body of the alternator 9.

In FIG. 5, reference numeral 9 denotes an alternator which contains a three-phase star-connected stator coil 91, a rotor coil 92, brushes 93, a three-phase full-wave rectifier 94 made up of a diode bridge, an IC regulator 95, and change-over switches SW1 and SW2. The changeover switches SW1 and SW2 are changed over by the ECU 10. The change-over switch SW1 connects an end of the rotor coil 92 to the ECU 10 or to the IC regulator 95. When an end of the rotor coil 92 is connected to the ECU 10, the field current of the rotor coil 92 is controlled by the ECU 10. Further, the change-over switch SW2 connects the three-phase full-wave rectifier 94 to either the IC regulator 95 or to the EHC 5. The IC regulator 95 has a charging terminal B, an ignition terminal IG connected to an ignition switch 97, a lamp terminal L connected to a charge lamp 96, a field current terminal F connected to the rotor coil 92, a phase terminal P connected to one of the phases of the stator coil 91, and an earth terminal E that is grounded. The other end of the charge lamp 96 is connected to the ignition switch 97, and the other end of the ignition switch 97 is connected to a battery 8 and to an electric circuit, that is not shown, of an automobile.

In the embodiment constituted as described above, the change-over switches SW1 and SW2 are connected as shown by dotted lines in an ordinary state where the ignition switch 97 is turned on, and the electric power generated in the stator coil 91 is rectified through the three-phase full-wave rectifier 14 and is input to the battery 8 via the IC regulator 95. The charge lamp 96 turns on. This state corresponds to the state where the contact 11B of the relay 11 is turned on in FIG. 1.

Immediately after the start of the internal combustion engine by turning the ignition switch 97 on, the change-over switches SW1 and SW2 are connected as shown by solid lines due to the ECU 10 being in the condition where the EHC 5 is to be supplied with electric current, and the field current of the rotor coil 92 is controlled by the ECU 10. In this state, the electric power generated in the stator coil 91 depending upon the field current flowing into the rotor coil 92 is rectified through the three-phase full-wave rectifier 94 and is all input to the EHC 5. The charge lamp 96 is not turned on. This state corresponds to the state where the contact 11A of the relay 11 is turned on in FIG. 1.

In the embodiment of FIG. 5, immediately after the start of the internal combustion engine, the change-over switches SW1 and SW2 are changed over as shown by solid lines until a predetermined period of time T elapses, the field current of the rotor coil 92 is controlled by the ECU 5 and the output of the alternator 9 is supplied to the EHC 5.

Figure 6:
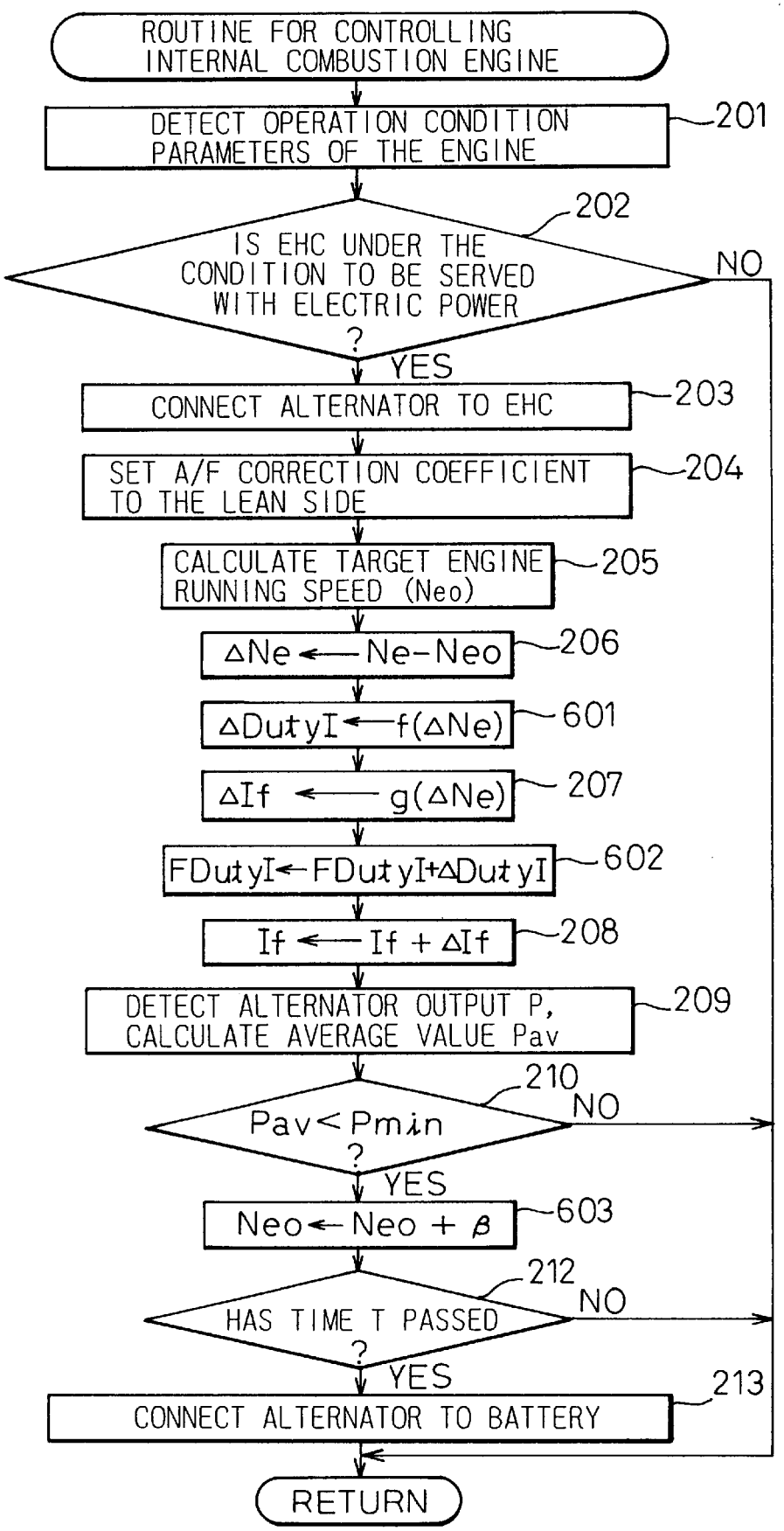
FIG. 6 is a flow chart illustrating another routine for controlling the internal combustion engine in the apparatus for controlling the internal combustion engine mounting the electrically heated catalyst of the form shown in FIG. 1.

FIG. 6 is a flow chart illustrating a routine for controlling the internal combustion engine in the apparatus for controlling the internal combustion engine mounting the electrically heated catalyst of FIG. 1 according to a second embodiment. In the embodiment of FIG. 6, the air-to-fuel ratio of the internal combustion engine is set to be lean when the electric power is supplied to the EHC 5, and the field current of the alternator is controlled depending upon the running speed of the engine and, besides, the amount of the intake air flowing through the ISC passage is controlled, so that the engine will not lose stability under this condition.

In the flow chart of FIG. 6 illustrating the control procedure, the same steps as those of the flow chart of FIG. 2 are denoted by the same numerals to simplify the description. The control routine for the EHC may be executed maintaining an interval of about 10 ms.

At a step 201, operation condition parameters of the internal combustion engine are detected. At a step 202, it is determined whether the EHC 5 is in a condition to be supplied with electric power. When the EHC 5 is in a condition to be supplied with electric power, the program proceeds to a step 203 where the contact 11A of the relay 11 is turned on and the alternator 9 is connected to the EHC 5. At a next step 204, the air-to-fuel ratio correction coefficient is set to a value on the lean side. At a step 205, a target running speed Neo of the engine is calculated based upon the operation condition parameters of the engine found at the step 205. At a step 206, a deviation ΔNe is found between the target running speed Neo of the engine and the running speed Ne of the engine that is detected.

Figure 7:
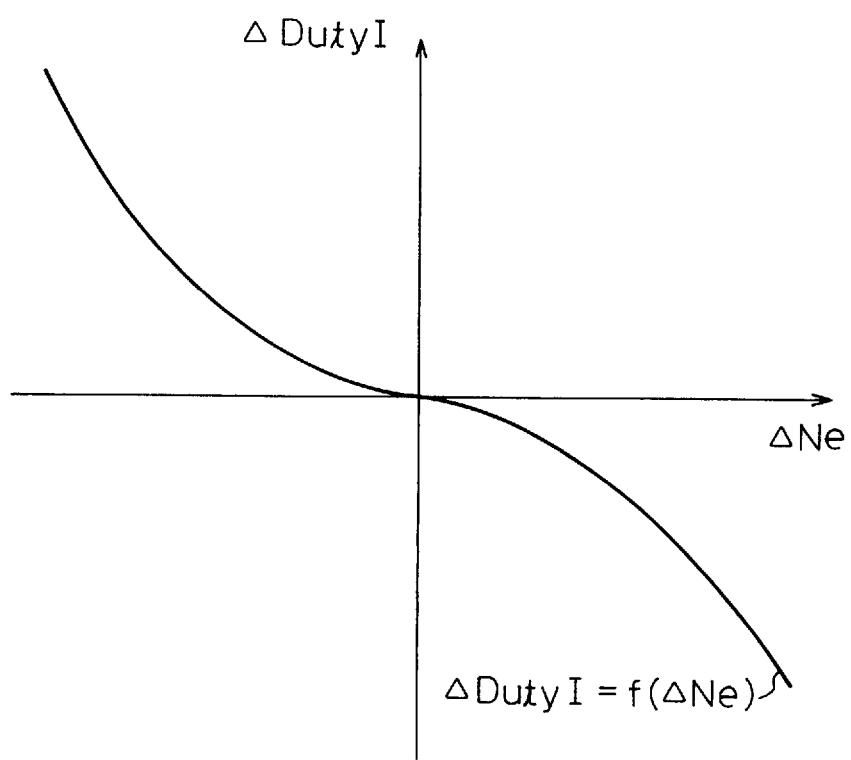
FIG. 7 is a diagram of characteristics for determining a correction value for the opening degree of an ISC in response to a deviation between a desired running speed of the internal combustion engine and the practical running speed.

At a step 601, a correction duty value ΔDuty I is found by f(ΔNe) from the deviation ΔNe between the practical running speed Ne and the target running speed Neo of the engine in order to control the opening degree of the ISC valve V1 in the ISC passage 2A explained with reference to FIG. 1. FIG. 7 illustrates the ΔDuty I=f(ΔNe) characteristics. Then, a step 207 is executed, and a correction field current ΔIf for correcting the field current of the alternator 9 is found by g(ΔNe). FIG. 3 illustrates ΔIf=g(ΔNe) characteristics.

After the correction duty value ΔDuty I for the ISC valve V1 and the correction field current ΔIf are found at the steps 601 and 207, a final duty value ΔFDuty I for controlling the opening degree of the ISC valve V1 is calculated at the step 602 by adding the correction duty value ΔDuty I to the present final duty value ΔFDuty I. At a next step 208, a final field current If is calculated by adding the correction field current ΔIf to the present field current If. As the final duty value ΔFDuty I and the final field current If are found as described above, the electric power output from the alternator 9 with this final duty value ΔFDuty I and this final field current If is detected at a step 209, and an average value Pav of the output power P within a predetermined period of time is calculated.

At a following step 210, it is determined whether the average value Pav of the power P output by the alternator 9 within a predetermined period of time that is calculated is smaller than a lower limit Pmin of the output power of the alternator 9 or not. When Pav≧Pmin, the routine ends. When Pav<Pmin, the output power P of the alternator 9 is insufficient, and the program proceeds to a step 603. At the step 603, a predetermined value β is added to the present target running speed Neo to increase the running speed Ne of the engine, whereby the alternator 9 produces an increased output power P to prevent insufficient heating of the EHC 5.

After the step 603, it is determined at a step 212 whether a predetermined period of time T has passed or not. When the predetermined period of time T has not been passed, the routine ends. When it is, on the other hand, discriminated at the step 212 that the predetermined period of time T of about 20 seconds has passed, the contact 11A of the relay 11 is turned off and the contact 11B is turned on at the step 213, and the alternator 9 is connected to the battery 8 to terminate the supply of electric current to the EHC 5.

Figure 8A:
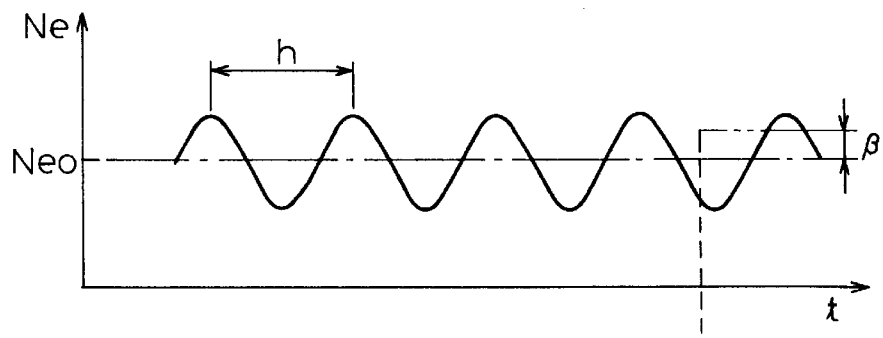
FIG. 8A is a diagram illustrating a fluctuation in the practical running speed of the engine relative to a desired running speed of the engine.
Figure 8B:
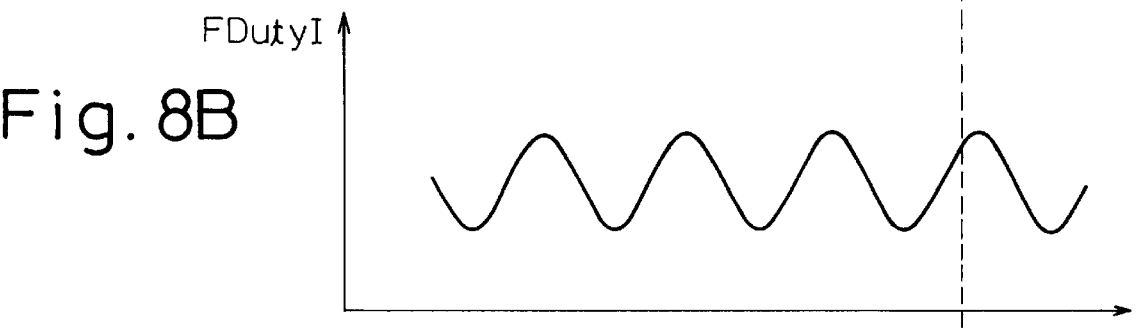
FIG. 8B is a diagram illustrating characteristics for controlling the duty ratio for the ISC valve in response to the fluctuation in the running speed of the engine of FIG. 8A.
Figure 8C:
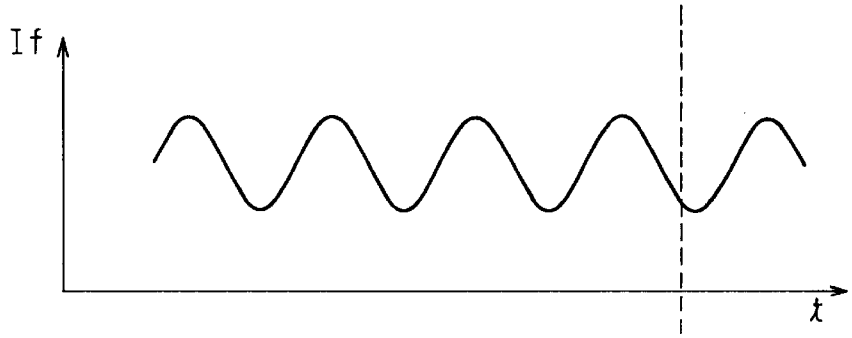
FIG. 8C is a diagram illustrating characteristics for controlling the field current in response to the fluctuation in the running speed of the engine of FIG. 8A.

FIGS. 8A to 8D illustrate changes in the engine running speed Ne, in the duty ratio of the ISC valve V1, in the field current If and in the average value Pav of the output of the alternator 9 under the control in compliance with the flow chart of FIG. 6. When the practical engine running speed Ne changes relative to the target engine running speed Neo as shown in FIG. 8A, the duty ratio for the ISC valve V1 and the field current If change as shown in FIGS. 8B and 8C following these changes in order to decrease the deviation ΔNe between the target engine running speed Neo and the practical engine running speed Ne. That is, when the engine running speed Ne becomes larger than the target engine running speed Neo, the duty ratio for the ISC valve V1 decreases as will be comprehended from the characteristics of FIG. 7 and correction value in the field current If of the alternator 9 increases as will be comprehended from the characteristics of FIG. 3, so that the field current If increases.

The engine running speed Ne decreases with a decrease in the duty ratio for the ISC valve V1. Besides, the load to the engine increases with an increase in the field current If of the alternator 9 and, hence, the engine running speed Ne decreases. This, however, becomes opposite when the engine running speed Ne becomes smaller than the target engine running speed Neo. As will be understood from the characteristics of FIG. 7, the duty ratio for the ISC valve increases and as will be understood from the characteristics of FIG. 3, the correction value in the field current If of the alternator 9 decreases and the field current If decreases. The engine running speed Ne increases with an increase in the duty ratio for the ISC valve V1. Moreover, the load to the engine decreases with a decrease in the field current If of the alternator 9 and the running speed of the engine increases.

In the second embodiment as described above, HC in the exhaust gases decreases as the air-to-fuel ratio of the internal combustion engine is set to the lean side. Besides, the amount of the intake air passing through the ISC valve V1 under the lean condition and the field current of the alternator are controlled, and the load to the internal combustion engine is so controlled that a deviation disappears between the target running speed of the engine and the practical running speed. Therefore, the engine is prevented from losing stability under lean conditions.

Figure 8D:
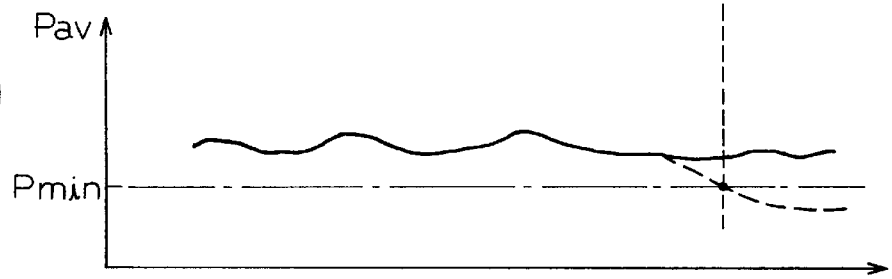
FIG. 8D is a diagram illustrating an average current output from the alternator depending upon a field current of FIG. 8C for every predetermined period of time.

Furthermore, when the average value Pav of the output P of the alternator 9 becomes smaller than the lower limit Pmin as indicated by a broken line in FIG. 8D, the target engine running speed Neo is caused to increase as shown in FIG. 8A, the opening degree of the ISC valve V1 is increased following thereto and the field current If is increased. Therefore, an increased amount of electric power is supplied from the alternator 9 to the EHC 5 which is then reliably heated.

According to the apparatus for controlling an internal combustion engine mounting an electrically heated catalyst of the second embodiment, when the amount of the generated electric power has decreased as a result of controlling the field current of the alternator, the running speed of the internal combustion engine is caused to increase to compensate for the lack of electric power supplied to the electrically heated catalyst. Therefore, the condition for heating the electrically heated catalyst is not affected.

According to the present invention as described above, when an electric current is supplied to the electrically heated catalyst, the air-to-fuel ratio of the internal combustion engine is controlled to become lean so that the amount of oxygen increases in the exhaust gases without the need of supplying the secondary air to the upstream side of the electrically heated catalyst, and the electric current is supplied to the electrically heated catalyst from the alternator mounted on the internal combustion engine making it possible to control the load to the internal combustion engine, in order to promote the rise in the temperature based upon the reaction of the catalyst with the fuel without causing the internal combustion engine to lose stability under lean conditions.

What is claimed is:

1. An apparatus for controlling an internal combustion engine mounting an electrically heated catalyst having a catalyst carrier which is attached to the exhaust gas passage and is electrically heated, comprising:
   an operation condition detection means for detecting the operation conditions of the internal combustion engine;
   a current-supplying condition detection means for detecting whether the electrically heated catalyst is in a condition to be supplied with an electric current;
   an alternator connection switching means which, when the electrically heated catalyst is in a condition to be supplied with an electric current, disconnects the alternator driven by the internal combustion engine from a battery and connects it to the electrically heated catalyst;
   an air-to-fuel ratio-setting means for setting the air-to-fuel ratio of the internal combustion engine to a lean region while the electric current is being supplied to the electrically heated catalyst;
   a target running speed calculation means for calculating a present target running speed of the engine from the calculation conditions of the engine that are detected;
   a running speed deviation operation means for calculating a deviation between the target running speed that is calculated and the present running speed of the engine; and
   field current control means for controlling the field current of the alternator toward a direction in which the deviation decreases.

2. An apparatus for controlling an internal combustion engine mounting an electrically heated catalyst according to claim 1, wherein said field current control means work to increase the field current of the alternator in order to increase the load to the engine and to decrease the running speed of the engine when said target running speed is smaller than the present running speed of the engine and the deviation has a positive value, and work to decrease the field current of the alternator in order to decrease the load to the engine and to increase the running speed of the engine when said target running speed is larger than the present running speed of the engine and the deviation has a negative value.

3. An apparatus for controlling an internal combustion engine mounting an electrically heated catalyst according to claim 1, further comprising:

an amount of supplied electric power-monitoring means for monitoring the amount of electric power supplied from said alternator to the electrically heated catalyst; and a means for increasing the amount of electric power generated by the alternator in order to forcibly increase the field electric current by a predetermined value only when an average amount of electric power that is supplied within a predetermined period of time becomes smaller than a predetermined value.

4. An apparatus for controlling an internal combustion engine mounting an electrically heated catalyst according to claim 1, further comprising amount of intake air control means for controlling the amount of the air taken in by the internal combustion engine toward a direction in which said deviation decreases.

5. An apparatus for controlling an internal combustion engine mounting an electrically heated catalyst according to claim 2, further comprising:

an amount of supplied electric power-monitoring means for monitoring the amount of electric power supplied from said alternator to the electrically heated catalyst; and a means for increasing the amount of electric power generated by the alternator in order to forcibly increase the field electric current by a predetermined value only when an average amount of electric power that is supplied within a predetermined period of time becomes smaller than a predetermined value.

6. An apparatus for controlling an internal combustion engine mounting an electrically heated catalyst according to claim 4, wherein said amount of intake air control means control the duty ratio of an ISC valve that is provided in the intake passage of the internal combustion engine.

7. An apparatus for controlling an internal combustion engine mounting an electrically heated catalyst according to claim 4, wherein, when said target running speed is smaller than the present running speed of the engine and the deviation has a positive value, said field current control means work to increase the field current of the alternator in order to increase the load to the engine, and said amount of intake air control means work to decrease the amount of the intake air in order to decrease the running speed of the engine and when said target running speed is larger than the present running speed of the engine and the deviation has a negative value, said field current control means work to decrease the field current of the alternator in order to decrease the load to the engine and to increase the running speed of the engine, and said amount of intake air control means work to increase the amount of the intake air.

8. An apparatus for controlling an internal combustion engine mounting an electrically heated catalyst according to claim 4, further comprising:

an amount of supplied electric power-monitoring means for monitoring the amount of electric power supplied from said alternator to the electrically heated catalyst; and an engine running speed correction means for forcibly increasing the target running speed of the internal combustion engine by a predetermined value only in case an average amount of electric power that is supplied within a predetermined period of time becomes smaller than a predetermined value.

9. An apparatus for controlling an internal combustion engine mounting an electrically heated catalyst according to claim 6, wherein, when said target running speed is smaller than the present running speed of the engine and the deviation has a positive value, said field current control means work to increase the field current of the alternator in order to increase the load to the engine, and said amount of intake air control means work to decrease the amount of the intake air in order to decrease the running speed of the engine and when said target running speed is larger than the present running speed of the engine and the deviation has a negative value, said field current control means work to decrease the field current of the alternator in order to decrease the load to the engine and to increase the running speed of the engine, and said amount of intake air control means work to increase the amount of the intake air.

10. An apparatus for controlling an internal combustion engine mounting an electrically heated catalyst according to claim 6, further comprising:

an amount of supplied electric power-monitoring means for monitoring the amount of electric power supplied from said alternator to the electrically heated catalyst; and an engine running speed correction means for forcibly increasing the target running speed of the internal combustion engine by a predetermined value only in case an average amount of electric power that is supplied within a predetermined period of time becomes smaller than a predetermined value.

11. An apparatus for controlling an internal combustion engine mounting an electrically heated catalyst according to claim 7, further comprising:

an amount of supplied electric power-monitoring means for monitoring the amount of electric power supplied from said alternator to the electrically heated catalyst; and an engine running speed correction means for forcibly increasing the target running speed of the internal combustion engine by a predetermined value only in case an average amount of electric power that is supplied within a predetermined period of time becomes smaller than a predetermined value.

12. An apparatus for controlling an internal combustion engine mounting an electrically heated catalyst according to claim 9, further comprising:

an amount of supplied electric power-monitoring means for monitoring the amount of electric power supplied from said alternator to the electrically heated catalyst; and an engine running speed correction means for forcibly increasing the target running speed of the internal combustion engine by a predetermined value only in case an average amount of electric power that is supplied within a predetermined period of time becomes smaller than a predetermined value.

* * * * *